Patented June 5, 1951

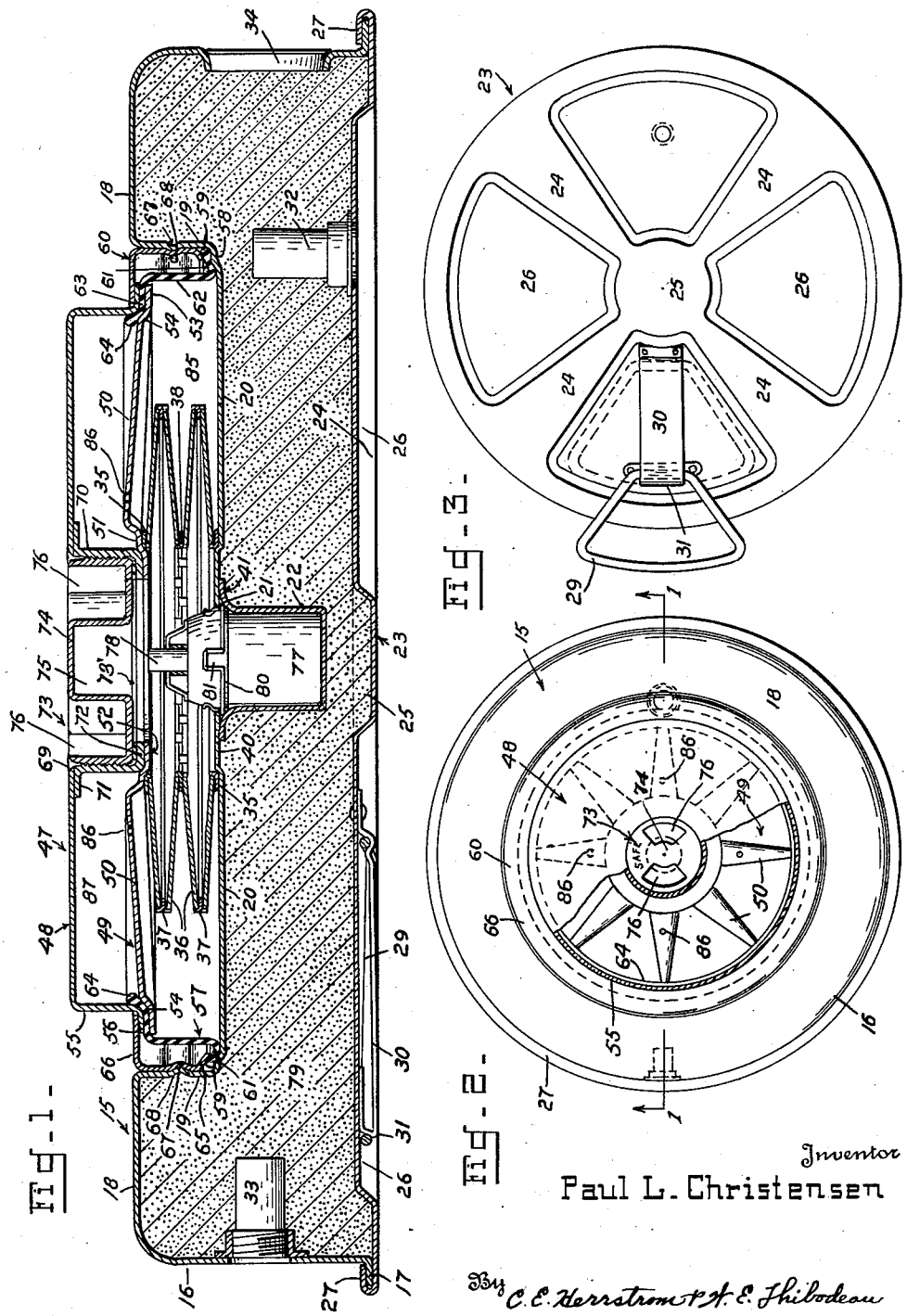

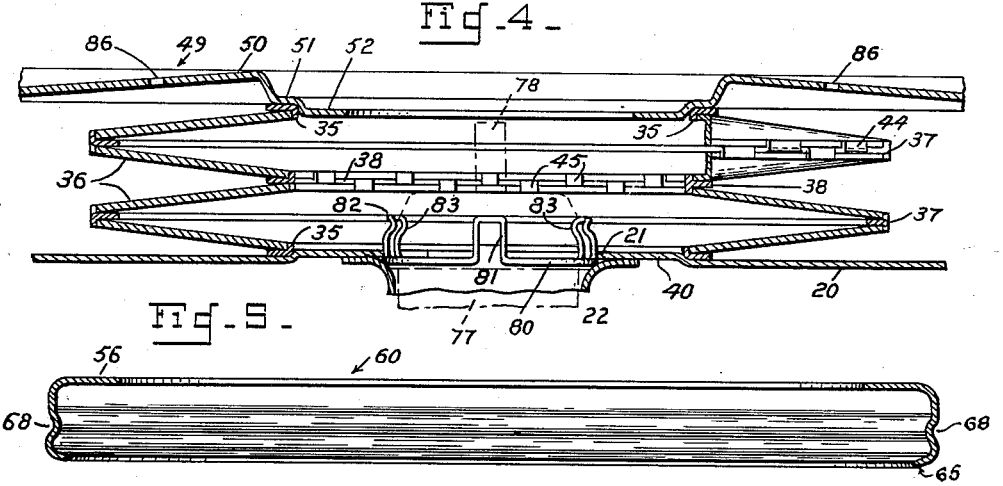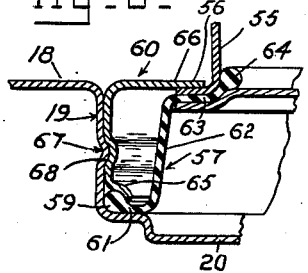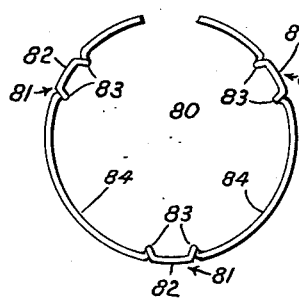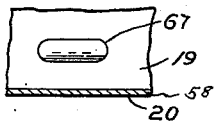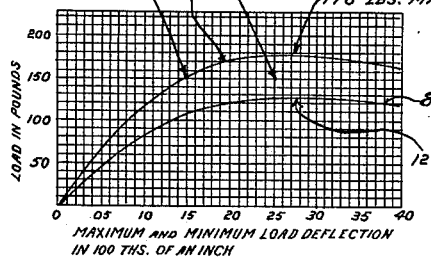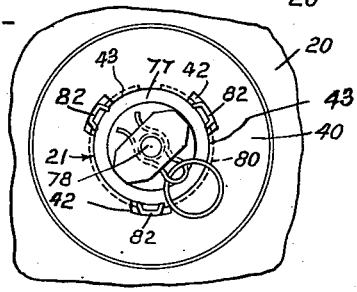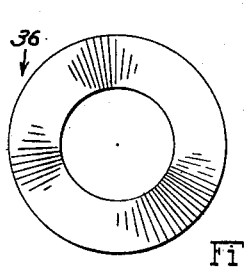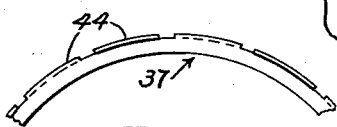

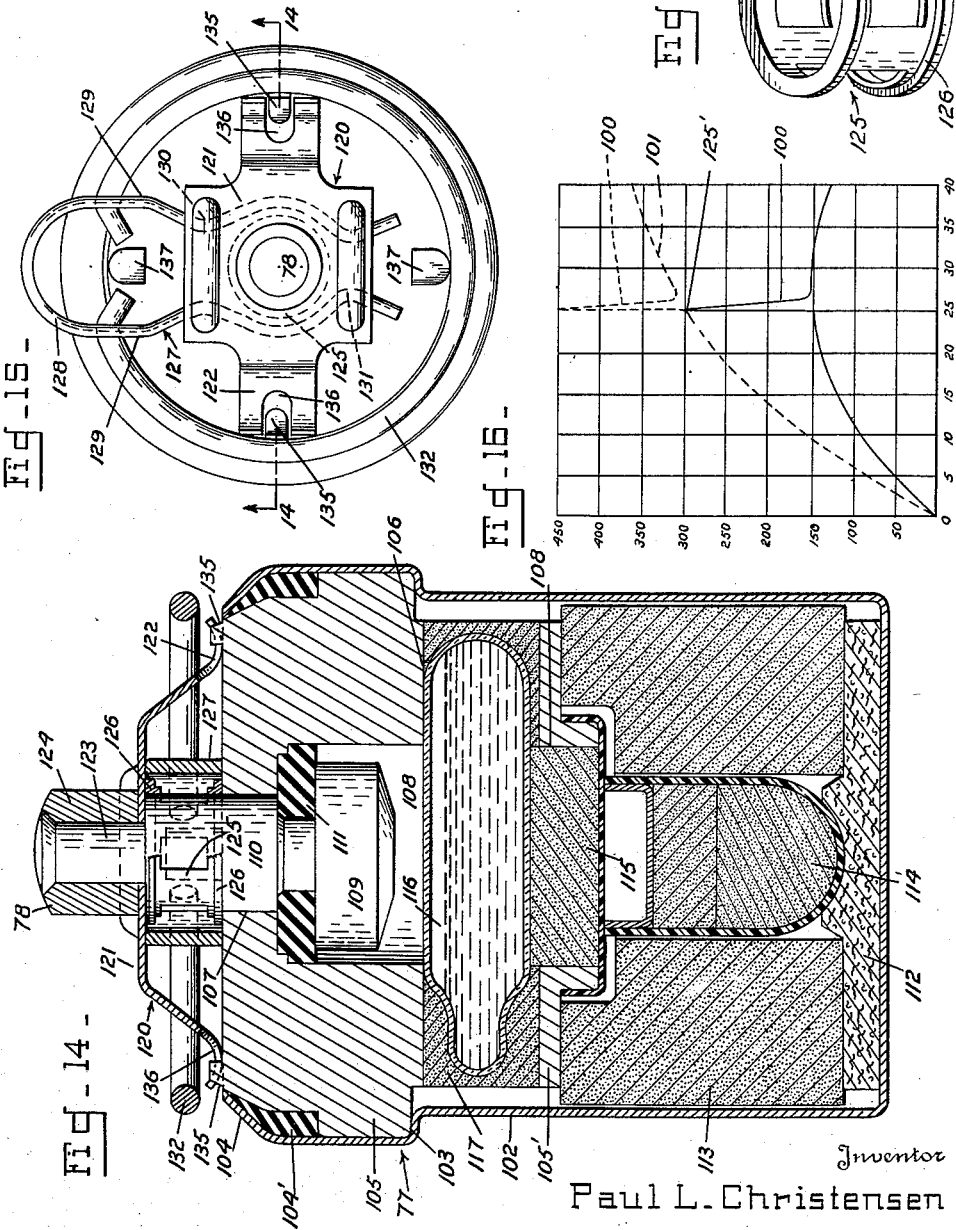

2,555,318

UNITED STATES PATENT OFFICE 2,555,318

MINE

Paul L. Christensen, Washington, D. C.

Application February 1, 1945, Serial No. 575,725

8 Claims. (Cl. 102—8)

(Granted under the act of March 3, 1883, as amended April 30, 1928; 370 O. G. 757)

The invention described herein may be manufactured and used by or for the Government for governmental purposes without the payment to me of any royalty thereon.

The invention relates to mines, and has for an object to present a mine having novel characteristics in operative movement of a pressure plate responsive to engagement by heavy vehicles or other loads, making it especially valuable for use as an antitank mine, although also readily adaptable to use as an anti-personnel device.

It is a special object of the invention to present a mine having a pressure plate spring supported in such manner as to be yieldable operatively only to predetermined loads, but which, as a normally unloaded spring, will require less operative movement to reach a detonating position than is required in prior conventional use of springs in mines, and wherein the spring at or about a desired limit of high load resistance movement, will rapidly diminish in resistance to the load imposed and will tend to collapse, allowing more of the weight applied to be directed to the complete certain and rapid operation of such moving parts as may require movement by the pressure plate. It is also a purpose to utilize this function within the elastic limit of the spring, so that repeated operation of the presser in "safe" setting will not impair its utility.

It is an important aim to so construct the mine that it will have a larger proportion of its explosive effective directly under and against an engaging tank tread or vehicle wheel, than is ordinarily the case in prior vehicle-operated mines.

A further important purpose of the invention is to so construct the device that liability of functioning of the armed mine by detonation of closely adjacent other mines or explosives is greatly reduced.

It is also a highly important object of the invention to present a novel pneumatic function in the device, and construction by which such pneumatic function is performed so as to contribute to the safety of the device in a novel way.

It is a related object to offer a construction in which, under influence of, and partial operation by, the pressure wave from an external explosion, the mine will offer a resistance to operation far in excess of the normal opposition to vehicle or personnel operation and will dissipate the force so applied without detonation or impairment of the mine.

A further important attainment in view is to enable the ready manufacture of a mine having the foregoing advantages by quantity production methods, with liberal tolerances of variation from standard. Particularly is it possible to tolerate variations of travel of the pressure plate or spider to functioning position with practically no variation of the load at which it is desired that the mine shall function.

In the embodiment of the invention it is sought particularly to improve the curve of ratio of load to deflection of a spring as compared to ordinary use of springs, and specifically to attain this by a novel proportioning of a Belleville spring device in relation to the range of movement of the presser.

The function of the spring is distinguished from the function derived from a conventional construction and use of a Belleville spring, in the fact that instead of a simple cone form being employed the cone is so truncated that a spring of comparatively large base diameter but small radial extent is presented, and representing a section of a cone of comparatively low altitude. In this way a spring of very limited extent of movement from an initial high strength of load sustaining position to a critical point of rapid resistance drop and collapse is secured, with a very high loading capacity relative to the amount of material used, as well as differing otherwise from conventional practice, as will appear.

It is also a desideratum to enable the ready retention of prior practices of high advantage in mine production, such as the complete enclosure of less stable boosters by the more stable main bursting charge, so that the latter may act as protection as well as securing intimate relation of the booster and main charge.

It is also a purpose to utilize the main explosive charge as a structural and load-sustaining element of the mine in a novel way.

A high purpose of this invention is to present a mine of the kind indicated and having the benefits of function and structure enumerated, wherein the effective water proofing of the mine may be attained in a novel and extremely simple and economical manner.

Additional objects, advantages and features of the invention reside in the construction, arrangement and combination of parts involved in the embodiment of the invention as will be apparent or understood from the following description and accompanying drawings, wherein:

Fig. 1 is a section slightly less than actual size on the line 1—1 of Fig. 2 of a mine embodying my invention, in safe position;

Fig. 2 is a top view thereof with parts broken away;

Fig. 3 is a bottom view of the mine;

Fig. 4 is an enlarged section of the Belleville spring assembly;

Fig. 5 is a section of the retainer ring, alone;

Fig. 6 is an enlarged cross section of the flexible air seal;

Figs. 7 and 8 are a top view and side elevation of the detonator retainer spring;

Fig. 9 is a fragmentary elevation of one of the retainer engaging dimples in the base;

Fig. 10 is a fragmentary plan of the plate 20 of the mine base, and detonator;

Fig. 11 is a graph showing the characteristic load-deflection curve of the spring of the invention;

Fig. 12 is a plan of one Belleville spring;

Fig. 13 is a fragmentary plan of spacer 37;

Fig. 14 is an enlarged vertical section of the fuse;

Fig. 15 is an enlarged top view of the fuse;

Fig. 16 is a graph of a hypothetical composite load-deflection curve of the Belleville spring stack and a columnar element coordinated therewith, and by dotted line a fictitious curve representing generally a resultant load-deflection curve including the components of the Belleville spring assembly, the compressed air in chambers 85 and 87 balanced at full load, and the columnar element.

Fig. 17 is an isometric perspective of the sleeve by which the columnar component of load impedance is introduced, this sleeve having rectangular openings in its sides to reduce its failure load as may be required.

Referring more particularly to the drawings, there is illustrated a mine comprising a base 15 pressed from sheet metal, having an annular outer wall 16 with an out-turned foot flange 17, the wall curving inward at the upper part and being continued horizontally a short distance, constituting an annular flat top 18. At the inner edge of the top 18 the material of the base is pressed downward, forming a cylindrical inner depending wall 19 from the bottom of which the material of the base is continued horizontally to form a lower flat top plate 20 extending horizontally entirely over the area within the wall 19, excepting a central large opening 21, the edge portion around the opening being offset upward slightly as a flat boss 40 later referred to and having secured to its under side a conventional lip flange 41 of a fuze well 22, the bottom of which is considerably above the level of the flange 17. The edge of the opening 21 is formed with three wide crenelations 42 leaving projections 43 therebetween defining the extreme inner edge of the opening 21.

A bottom plate or base cover 23 is provided, consisting of a circular blank pressed to form radial raised spokes 24, raised hub 25 and bounding rim on the lower face and alternated sector recesses 26 between the spokes. The base cover has a circumscribing flange 27 receiving the flange 17 snugly therewithin, and seamed thereto.

A porting bail handle 29 is mounted pivotally and translatively on the cover 23 within one of the recesses 26, having a narrow part with a pivot bar thereacross set under a radial guide strap 30 under which the pivot is slidable from the inner part of the recess 26 to near the outer boundary of the recess. The strap is depressed near its inner end to yieldingly hold the pivot bar of the bail at that end of the guide and the opposite end of the strap is bent downward with a curve of such size and position that a bulge 31 is formed spaced from the underlying surface of the cover 23 more than half the diameter of the round rod stock of which the bail is formed. The central swinging handle part proper of the bail has a radius less than the distance from the bulge 31 to the depression in the strap, so the cross grip portion of the bail may be pressed against and sprung past the bulge, and so retained close against the plate 23.

A small opening, eccentrically located, may be formed in the plate 23 in which an activator cup 32 is secured, open to the outer side of the plate 23, to receive conventionally a detonator for special use alternative to the normal use of the mine. A similar cup 33 may likewise be set in the wall 16 for like use alternatively, and at the opposite side of the mine a filling opening and closing cap 34 of a usual kind is provided in the wall 16.

Outwardly of and encircling the boss 40 of the plate 20 there is provided a lower annular spring seat 35 upon which is set a series of Belleville spring rings 36 with outer spacers 37 and an inner spacer 38 and a surmounting seat ring 35 similar to the one at the bottom of the series.

The Belleville rings are all identical resilient annular thin sheet steel plates suitably pressed to give them a slightly conical form. In practice, for a mine of the particular size and service indicated, these rings have been formed of high carbon steel, a typical composition range of which is, at one extreme, percent: carbon 0.65 to 0.75; manganese 0.55 to 0.90; phosphorus not exceeding 0.04; sulphur not to exceed 0.055; and at the other extreme, carbon 0.90 to 1.05; manganese 0.25 to 0.50; the tolerance of phosphorous and sulphur being the same throughout. The last mentioned alloy has been successfully employed as well as steels with lower carbon content. The springs are blanked and formed to an outside diameter of approximately five inches in the instant case and an inside diameter of approximately 2.6 inches. After annealing they are heat treated to a "Rockwell" "C" hardness of 50–54, so that under load a load-deflection curve will be produced within the zone 39 formed between maximum and minimum allowance curves 88–89 shown in Fig. 11 whereby the spring will exhibit a high increase in resistance relative to small deflection movements, to a maximum load after which there will be a fall in resistive force under further deflection in operation of the invention. The small extent of deflection within this high load function is attained as shown in Fig. 11, is a notable feature of the invention. The altitude of the geometrically projected cone of which the unloaded ring 36 represents a truncation is very low compared to ordinary usage in Belleville springs, but particularly low in relation to the total operating movement of the presser later described, and the angle of one of the conic elements to the base plane normal to the axis in this instance is in the neighborhood of four degress, permitting a total deflection movement in the single piece of approximately .097 inch from high unloaded position of the inner edge of the top ring to a low position (whereat the ring is in planiform shape), which latter position is slightly beyond the position where the maximum load would be manifest. The total deflection movement with the four springs stacked is approximately 0.41 inch. In the present instance four of the rings with the seats 35 and spacers 37—38 comprise a stack, the rings superimposed in concentric relation, arranged in pairs with their concave sides in mutual juxtaposition. The lower seat spacers 35 consist of rings of thin sheet metal flanged to fit in the openings of the adjacent Belleville rings and to extend between the rings and the plate 20 or a part 51 over the stack as the case may be. Between the registered outer perimetral edges of each pair of springs 36 there are spacer rings 37 radially slotted at intervals in their outer edge parts only, and alternate tongues 44 thus formed are turned downward and the others turned upward so as to fit around and against respective spring edges as in Fig. 4. Between the two pairs of rings the annular spacer 38 is provided, having at its inner part tongues 45 extended alternately upward and downward to fit before the inner ring edges, in the openings of respective rings. The spacer tongues 44 and 45 serve to hold the springs accurately in registry so that effective functioning of the springs is assured, without possibility of the rings slipping out of alinement.

A composite presser 47 is provided, consisting of two spaced upper and lower annular plates 48—49 which may be reinforced by pressed stiffening radial ribs 50 as in the lower one, which is also slightly conical and formed with an annular depressed planiform shoulder 51 or seat. A large opening is formed in this plate surrounded by a further depressed annular flat boss 52 of the same diameter as the one 40, the top end spacer and seat ring 35 being set around this boss 52. The seat 51 is depressed sufficiently to bear lightly upon the spring stack assembled thereunder and press it on the top plate 20, when the mine case and presser 47 are assembled and free of load.

The periphery of the lower plate 49 is formed with an annular depressed planiform horizontal seat edge 53, and the diameter of this plate is considerably less than that of the depending wall 19, so that the plate 49 may move freely downward and upward over the depressed plate 20 within the wall 19 with a good space between. An inwardly and upwardly sloping conical seat 54 of small radial extent extends from the flat seat portion 53 on the plate 49. The top plate 48 is formed with an outer concentric vertical cylindrical wall 55 located partly over the seat 53, and a horizontal outturned flange 56 is formed on the base of the wall 55 coextensive with the seat 53 and clamping between the two the upper thickened edge portion of a moisture and pressure seal or web 57 now to be described. The mine base is formed with a horizontal annular seat 58 slightly above the inner part of the plate 20 at the base of the depending wall 19 and a lower outer beaded edge 59 of the seal 57 is pressed upon this seat by a retainer ring 60 fitted within and against the wall 19. The height of the wall 55 approximates the vertical extent of the wall 19, and the seal 57 consists of a web of strong elastic rubber, synthetic rubber, or the like, capable of resisting considerable pneumatic pressures between the plates 20 and 49, as will appear. It is shaped so as to provide an approximately horizontal lower lip 61 on the periphery of which the bead 59 is formed and a conical nearly cylindrical medial part 62, having a horizontal top lip 63 on which an upper bead 64 is formed just within or at the seat 54 and flange 56. The retainer ring 60 comprises a substantially cylindrical body part having a lower inturned and rounded edge portion 65 engaging upon the bead 59 and a top horizontal inturned annular flange 66 extended inwardly near to the wall 55 and overlying the flange 56. The wall 19 is formed with a number of horizontally elongated dimples 67, all at the same height above the seat 58 and the retainer ring is formed with a circumscribing external groove 68 at nearly the same height above the inturned edge 65, so that when the retainer is pressed downwardly within the wall 19 the ring may pass with a driving fit over the dimples until the lower bead 59 is tightly compressed by the edge 65, when the dimples will snap into the groove and hold the retainer in assembled position. The free height of the spring stack with spacers is approximately 0.732 inch and the solid height about 0.329 inch. The sheet stock for the springs is approximately 0.058 inch thick.

The top plate 48 stops at a circular concentric opening 69 of approximately the same diameter as the boss 52. Here a bushing 70 of very thick pressed sheet metal is provided having an outturned top flange 71 welded tight to the underside of the plate 48, and a short inturned bottom flange 72 welded tight to the inner downset edge part or boss 52. The bushing is interiorly threaded and has an arming and safety plug 73 screwed thereinto equal in depth to the bushing. The plug may be inverted in the bushing and has a flat detonator-engaging plate 74 at one end and a deep recess 75 at the other end. Two sockets 76 are formed at diametrically opposite sides of the plug on each end to enable its ready screwing or unscrewing. In Fig. 1 the plug is in safety position with the recess 75 downward but may be withdrawn and inverted to arm the mine. A gasket 73' is set on the flange 72.

In the well cup 22 there is set a detonator 77 of conventional construction having an operating plunger pin 78 extended upwardly therefrom on the axial center of the mine. A movement of the pin downward beyond a given minimum causes action of the detonator, the details of which may conform to any of several standard forms available and well understood; and therefore not described in detail. The top of the pin sets upward within the openings of the lower springs a sufficient distance to be close to the plate 74, when the plug 73 is in arming position, so as to operate the detonator pin to detonating or firing position on a desired downward stroke of the presser 47 a little short of full stroke thereof.

It may be noted that the top plate 20 of the base is not reinforced, and is not rigid, but may be depressed readily when the case and operative parts are assembled in the relations described. In consequence it is possible to proportion the vertical dimensions of the unloaded spring and spacer group so that it exceeds the initial spacing which the plates 20 and 49 tend to assume and on assembly the plate 20 yields to the spring stack without material deflection of the springs, but holding the assembly snugly and firmly in operative relations. This permits a snug assembly without critical tolerances in the forms of the stampings.

A bursting charge 79 is introduced into the base through the filling opening after complete assembly of the parts as last described, excepting the detonator; and this explosive is of such density that the plate 20 is thereafter supported by the explosive itself rigidly for loads greatly in excess of those to be expected. Trinitrotoluol, customarily used in such mines, is warmed to a liquid state and poured into the base through the filling opening at 34 and allowed to solidify in intimate contact with the plate 20 and bottom head 23. This explosive is quite stable and safe against stresses and shocks short of detonative force, serving satisfactorily to support the plate 20 under working loads.

The well cup is made with an interior diameter in excess of that of the external diameter of the detonator case, and to retain the detonator firmly in position an annular basket spring 80 is provided to fit around the detonator between the sides thereof and the outwardly flared top of the wall of the well cup, as shown in Figs. 1 and 4. This spring consists of a single length of spring wire having a number of U-shaped upstanding loops 81 formed therein, spaced from each other along the length of the wire. The whole wire is bent throughout to form a split ring which may fit closely around the upper part of the detonator with the extremities of the wire nearly meeting. Each of the loops is formed with its bight 82 turned outward, the upper parts of the arms of the loops being inclined inward to near the bight part and then recurved outwardly, each forming a wiper heel or cam 83 on each loop arm at the inner side of the spring, adapted to wipe against the side of the detonator case when the latter is inserted in the spring and well. The spring 80 may be made with a set tending to open to a ring size larger than the well cup, and requiring to be contracted to be entered therein and is entered in the upper part of the well with its connecting curved base parts 84 between loops engaged under the projections 43 of the opening 21 in the top plate 20. The loops extending upward in the crenelles 42 are inclined inwardly over the cup. There the spring remains during storage and shipment, the detonator being omitted until the mine is distributed for use. The projections 43 prevent causal withdrawal of the spring. To set the detonator in place the plug 73 is removed, and the detonator thrust down within the spring 80 and into the well, the heel parts 83 engaging against the detonator case, sliding thereon as the case is thrust down, until the heels 83 engage an upper bevelled part of the detonator case and the case sets upon the bottom of the well. The spring thereby holds the detonator firmly in place.

When the detonator is so set in place, the upper end of the plunger 78 is slightly spaced below the plane of the top of the base flange 72 of the bushing 70, and when the plug 73 is in safe position the plunger is received in the recess 75 in case the presser plate is depressed to its limit. But with the plug 73 inverted in the bushing and placed in arming position, the plate 74 will be close above the plunger (the maximum clearance is 0.12 inch) and in case the presser plate is depressed fully, the plate 74 will, after a short movement, engage and operate the plunger to fire the detonator, with the usual train of effects, according to the nature of the detonator.

By the construction described, a main pressure chamber 85 is constituted between the plates 20 and 49, bounded laterally by the seal 57 and, in a measure, by the springs 36 and spacers 35, 37 and 38, but including also the space inwardly thereof under the plate 49 and plug 73. A number of small apertures 86 are formed through the plate 49 (four have been used in the mine illustrated), of sufficient area (one eighth inch in this case) to permit relief of air under pressure in the chamber 85 at such rate that the presser when loaded will be permitted to move to its lower limit within a given time, and operate the mine after a moderately delayed or retarded movement. The space in the presser, between the plates 48—49 constitutes a secondary chamber 87 which is sealed by gasket 73' at the bushing 70 and at the seal 57 between the peripheral seat flanges of the plates 48 and 49.

In the operation of this device the control means functions with both a time factor and a load factor, and the requirements of both factors must be met to effect operation of the mine. At the same time it operates in such a manner that when the required minimum operating load is imposed, it becomes effective within a very short range of spring deflection, and near the completion of firing movement the presser will be largely relieved of spring impedance so that a much increased force is available and utilized in the completion of translative movement of the presser and detonator plunger. This increases the certainty of operation, as well as perfecting the assurance of action only under conditions which will ordinarily, involve offensive action against enemy material or personnel.

Thus, the springs as constructed will yield to a load of 150 pounds more or less, but the space in chamber 85, having a cubic air content of approximately 50 cubic inches at atmospheric pressure, will be reduced something less than one third in volume when the presser reaches a position a little short of detonating position adding approximately 150 pounds resistance (but on sudden depression of the presser, short of detonating position, produces for the moment an approximate back pressure of 1100 pounds), augmenting to that degree the impedance offered by the springs 36 to depression of the presser. If the load applied is less than the aggregate of spring and air pressure but beyond the maximum load resistance of the springs, and is removed in less than the time required for the vents 86 to relieve the total air pressure to a point below that which, supplementing the springs, will support the presser above detonating position, the full required detonating movement of the presser will not be effected, and the presser will be returned to initial position by the springs as air is returned through the vents 86 from chamber 87 to chamber 85. Air around the springs will pass to the interior thereof and to the plug 73 under load or in the opposite direction on recovery, without changing the ordinary loading effect.

The angle of the conic elements of the springs to the planes of their bases is such that in the pivotal movement of these elements on their bases when the springs are operatively loaded, they reach these planes in somewhat less than the total deflection of which the springs are capable under full downward stroke of the presser, and the detonating or firing position of the presser in its operation of the plunger 76 is near this position. That is to say, in order to fire or detonate the mine, such movement of the presser is required that the Belleville springs are nearly collapsed and moved from normal unloaded form to or beyond a nearly flat or planiform shape and may even be slightly deformed in an opposite or inverted conical form before the stopped or full stroke position of the presser is reached. It has been mentioned that the full stroke movement of the presser extends over .40 inch, and by reference to the graph of Fig. 11 it will be seen that in less than this extent of movement the springs will develop their maximum load sustaining capacity (this being approximately at .25 inch deflection), and there-beyond a decreased force is manifest by the spring, this diminishment being progressive then to the limit of .40 inch at full depression or "solid" position of the spring stack when the load is no longer resiliently supported by the springs, but is carried by the closely contacted inner edge portions of the springs and the spacers as a noncompressible or solid stack. This high efficiency pressure-deflection curve results from the fact that the conic angle mentioned causes the elemental parts of the spring to operate as levers close to dead center relation to the support; and close to the maximum molecular compression or condensed condition in the spring material resulting from the progressive movement of the spring material toward a more limited space at the planiform position, which also corresponds to "dead center" position of the conic elements as levers. Beyond this point, while large spring stresses would still tend to make it recover its original form, they are less effective because the tendency of the material to react from the compaction acts in opposition to the movement required for recovery of form.

At the flat position of the springs 36, and from a leverage standpoint, the load is more effective in opposing the resultant of all forces tending toward recovery of form, and at the same time the reaction of the material against volumetric compression is at its lowest value also, due to the dead center relation of the radial elements, so that the flattening 90 declination of the pressure deflection curve 88 of the graph is produced. It should also be noted that this movement and the attendant stresses also occur well within the limits of elasticity of the material of the spring, so that if the plug should be in safety position, the device may recover to full initial position and functional quality and capacity after a full stroke movement representing the full range of the curve 88. In the graph of Fig. 11 the abscissae represent the spring deflections in successive units of .01 inch measured horizontally, the coordinates represent the load in ascending units of ten pounds. In the graph it will be seen that the load value of the spring in relation to the extent of deflection is initially very high and its curve representation ascends abruptly to a high value at the knee 90 of the curve with a very small extent of deflection. The average or mean line representing the increase of load and deflection shows a ratio of more than 6 pounds load per hundredth inch deflection as far as the knee 90 where it rapidly approaches the horizontal and descends. It would not be practicable to produce a helical spring whose curve would flatten for the load stated within the same limit of movement. Similarly, where Belleville springs have been used it has not been known to proportion, shape and temper them to act within such deflection limits in a similar relation to load and operative movement for a detonator.

The manner of calculating Belleville springs generally is set forth in pages 90-93 of "Mechanical Springs," 1944, Associated Spring Corporation, Chicago, Illinois, a publication.

It may be seen from the chart of the load-deflection value of the springs that over a range of deflection from zero which is $15/18$ of the total deflection manifest under maximum load, there is an average gain of approximately 5.5 percent of the maximum load for each four percent of the total deflection at maximum load. The curve representation of a helical spring having a similar load value developed from repose at .25 inch deflection, would not flatten within the further deflection between .25 and .40 inch, but its resistance would continue to increase, and so greater force would be required to complete operation of the presser, instead of less. In any event, if the maximum spring load is attained before the presser reaches firing position, with conventional spring functions there would be less certainty of uniform action, since effect of any variation from load required would be most pronounced, while in applicant's device it would occur in a more or less flattened part of the curve with less material effect.

The resistance of air in the chamber 85 is proportional to the speed of depression of the plate 49 and extent of the movement of the latter by reason of the fact that by very rapid movement of the plate, high pressure is built up before a material venting of the air to chamber 87 can occur. In consequence this mine is peculiarly safe from detonation through operation of the presser by a concussive wave propagated by explosion nearby of a mine or high explosive shell, and like effects. The resistance of the presser to such forces may be much greater than the mere aggregate of spring and air pressure due to reduction of volume of air in the chamber 85, and may include substantial factors of inertia both in the presser and springs, in the air in both chambers opposing inward movement of the presser, as well as possible reverberation in the chambers and conversion or transduction of the concussive wave energy to momentum in the presser which may be readily and quickly dissipated by the dashpot action of the device subsequent to the first forcible and instantaneous resistance to the concussion wave. This mine has been shown to be safe against detonation above ground by the wave front propagated by a similar mine detonated at a distance of ten feet or a 37 pound H. E. bangalore at 20 feet, or a 500 pound H. E. shell at a distance of 50 feet.

As the mine may initially oppose a pressure several times as great as the normal operating load, due principally to the air impedance, if the minimum operating load is imposed, operation to firing position is delayed by the opposing air, rapid escape of which from chamber 85 and into the springs, however, permits a progressive movement of the presser so that it soon completes a full stroke. With the plug 73 in arming position the plunger 78 is depressed in the final movement of the presser (between .30 and .35 inch deflection) and detonation of the mine effected conventionally.

It will be noted that the seal 57 is held by elastic action of the plate 49 pressing upwardly against the flange 56 of the top plate 48. This clamping action is increased in force when a load is imposed on the presser, by reason of the air pressure in the chamber 85 acting against the plate 49 and weight applied to the plate 48.

It may be appreciated that as air enters the upper chamber 87 a pressure will be built up therein until a state of balance is reached in the two chambers at which time there will still be a total pressure proportionate to the reduction of volume of the whole body of air in the two chambers from that existing in initial position of the parts, and this force, aggregated with the load value of the springs when the presser is depressed to the maximum, may be regarded as the operating load for the mine exclusive of the increment represented by resistance of plunger 78.

If advisable, vents from the chamber 85 may be located otherwise than as specifically shown at 86, and may lead to the atmosphere, in some approved manner, if the effect of the chamber 87 is not required. In the event of complete venting to the atmosphere, the final support of the presser would be the Belleville spring stack, and the operating load would be approximately at the apex of the curve in Fig. 11, or at 100, Fig. 16.

Small differences in the altitude of the projected cone of a Belleville spring produce marked differences in the load-deflection curves resulting and heretofore it has been customary to use such springs in a form size and operative relation to the movement of the loaded member such that the maximum load apex of the curve falls far beyond the deflection point corresponding to the full operative or detonating movement of the loaded member. Thus in the present device, if conventional practice were followed, the springs would represent truncations of cones of greater altitude.

It is notable that all of the structural parts of this mine are pressed from sheet metal. Only the plug in the specific form shown required other production procedure, such as die-casting. In consequence, a comparatively large mine may be produced in the large quantity involved in modern warfare at low cost. This low cost is further contributed to by the simple assembly procedures involved, involving as they do, a minimum of labor and machine operations.

As above disclosed a mine is available which, aside, from opposition by the plunger 78 has a minimum operative load requirement, but which, when armed, is safe for short periods under suddenly applied loads of many times the required operating load. The detonator may be of a form which will add only slightly to the requirement of weight to operate the device, and might be of other construction than that specifically illustrated.

However, the particular detonator is specially coordinated with the remainder of the construction to effect an increase of load increment within the operating requirements as to load and deflection set forth above, to the end that antitank mines peculiarly suited to their field of use may be embodied. In addition it is made possible to quickly modify load requirements in simple and inexpensive manner without changing the main springs 36 or the presser and air retardance structure.

Considering the load-deflection curve of Figure 11, the invention has sought a means for increasing the load markedly when required as a curve component superimposed on such a curve as the ones 88 or 89, as hypothetically shown at 100 in Figure 16, which is intended to show an approximation of the components of the required operating load other than that of the aggregate balanced air pressure in the chambers 85 and 87 at the detonating position of the presser. The complete operating load-depression curve including all components named would be something like that shown by the dotted curve 101 in Fig. 16.

For the purpose of attaining this function, it is desired to incorporate means which near the knee of the mean of the curves of Fig. 11 will interpose a columnar resistance to further deflexion, and at the desired added component of load will fail abruptly substantially as shown in Fig. 16 at 100.

The fuse or detonator 77 by which these ends are attained in the present instance comprises a thin walled cylindrical cup 102, having an upper slightly enlarged wall part forming a shoulder 103, and inbent lip 104 forming an external bevel, by which a thick die-cast head block 105 is secured in the mouth of the cup against the shoulder 103, a rubber gasket 104' being interposed and confined by the lip 104.

The block 105 has a reduced part 105' below the shoulder 103 in which a diametrical hole 106 is formed, the upper side of which is close to the plane of the shoulder 103, and an axial upper bore 107 and larger lower axial counterbore 108 extending through the bottom of the block 105, which is extended in reduced size a short distance downward as a cup around the counterbore below the transverse hole 106.

The plunger 78 comprises a lower piston 109 loosely fitted in the counterbore 108 and having a bulged under face spaced above the hole 106 and a thick shaft 110 slidably fitted in the bore 107, extending above the flat top face of the block 105 a distance. In a groove circumscribing the base of the stem 110 a soft rubber seal ring 111 is set, snugly fitting the counterbore 108. In the bottom of the cup there is a fiber cushion 112 upon which there is set a booster 113 of tetryl, within which there is set a primer and detonator element 114 (P. E. T. N., for instance), exposed at the upper part of the booster to a further primer and igniter element 115 carried in the lower bored cup part of the block 105. Over and upon the primer 115, there is set in the hole 106 an elongated frangible ampoule 116 with a liquid content adapted to react chemically with the primer 115 to ignite the latter and the primer-detonator 114 as heretofore effected and well known. Usually the ampoule is of glass and its content an acid mixture (as $H_2SO_4$, 75%, ortho-nitrotoluene 25%) while the primer 115 may be one of the mixture heretofore known for the necessary reaction (say potassium chlorate 55%, lead sulphocyanate 45% by weight). The ampoule is against the upper side of the hole 106 and its ends may be surrounded and fixed in the hole by a support material 117 such as plaster of Paris, extending to the counterbore 108 and primer 115.

The lower end of the block 105 sets against the booster 113.

A bow spring 120 of thin steel and minor load sustaining value (say, five to ten pounds) is set over and resting at its out turned rounded extremities upon the smooth flat top surface of the head 105, around the plunger 78. The middle part 121 of the spring is broad and flat for a distance beyond the plunger on all sides and has planiform legs 122 extended diagonally downwardly and narrowed to their extremities. Two longitudinal stiffening ribs are formed in this flat part of the spring. The plunger shaft 110 is extended full diameter upward to the under side of the spring 120 where it is reduced in diameter to form a tenon 123. The flat of the spring is apertured to fit around this tenon and upon the full diameter top of the shaft 110. Over the flat of the spring there is set a collar 124 tight around the tenon and of somewhat greater diameter than the shaft 110, bevelled at its upper inner edge, and having the extremity of the tenon upset or staked therein. The end of the tenon takes the load component of the presser 47 and plug 73 remaining after compression of the springs 36 to a point adjacent or beyond the elbow 90 of the curve of Fig. 11, Under the spring 120 and slidably engaged around the shaft 110 there is a hard brass compression sleeve 125 (testing to Rockwell B 70), set upon the top face of the head 105 and against the flat under side of the spring 120 to hold the latter and the plunger at elevated position, against loads less than that predetermined as its increment of the total operating load for the mine. It is formed with thickened collars 126 at top and bottom as bearings. The collapsing load for this sleeve 125 in certain mines, for heavy antitank use has been one hundred and fifty pounds to one hundred and seventy pounds.

It will be appreciated that by diecasting the block 105 and adjusting the ampoule against the upper side of the hole 106, it is possible to establish close tolerances in the initial relation of the piston and ampoule by the length established for the collapsible sleeve 125. In the particular fuse shown the initial clearance between the piston and ampoule is approximately 0.025 inch, in which movement the sleeve 125 will have completely collapsed and will have ceased to oppose depression of the plunger. The resistance of the ampoule to movement of the plunger is immaterial and may be disregarded. The total movement of which the plunger is capable is in the neighborhood of 0.10 inch but the ampoule will be sufficiently disrupted for detonation action in approximately 0.03 to 0.04 inch, and it is not essential that the plunger move through the full stroke of which it is capable.

Since the springs 36 have a deflection movement of 0.25 inch to the flat part of the load-deflection curve of Fig. 11, and have available a further deflection movement of approximately 0.15 inch, it is practicable to adjust the initial spacing of the plug 73 above the plunger at 0.25 inch or more so that the springs will be fully loaded and an air pressure of 150 pounds more or less developed in the chambers 85—87 before the plunger is engaged by the plug 73. The quarter inch free movement thus afforded, or less, will be ample for the functioning of the mine for safety against detonation by nearby explosives or by mine destroying devices such as flails or strikers.

With such relation of the parts as last mentioned, the sleeve would become effective after 0.25 inch deflection or before and possibly after some slight movement of the plunger due to looseness or variations from standard measurements, so that including 0.03 inch movement of the plunger in crushing the sleeve 125 and 0.02 inch for crushing the ampoule, there would still be available a further margin of deflection movement of 0.10 inch or more of movement of the presser within the distance of full deflection movement shown by Fig. 11.

The clearance between the plug 73 and plunger may be reduced, if desired with some possible advantage in bringing the superimposed component of the sleeve 125 toward or in advance of the heel 90 of the curve of Fig. 11, affording room for greater tolerances in the relative movements of the several parts and in the proportions of parts, as may be understood.

In order to safeguard the fuze or detonator unit against casual operation, there is shown a bifurcated spring steel clasp pin 127 of flat strip stock, the width of which is slightly greater than the height of the sleeve 125, and its thickness ample to sustain contemplated maximum loads. The loads to be resisted may or may not be those to which the presser 47 is likely to be subjected, but may be some lesser force such as might be applied to the plunger incident to handling or shipment while separate from the mine.

The blank for this pin is bent in the middle to form a rounded loop 128, the arms 129 thus formed being bent convergently a short distance and then divergently, forming angular inner stop parts 130, the divergent parts being recurved inward over a distance from the part 128 greater than the external diameter of sleeve 125, so as to form opposed outwardly bowed parts and a narrow mouth opening 131 between the arms, outwardly of which the extremities of the arms are extended divergently at an acute angle to each other. The pin is formed with a set tending to hold the parts 131 spaced less than the diameter of the sleeve but open at their divergent ends sufficiently to permit the pin to be thrust longitudinally into embracing relation to the sleeve with the latter accommodated between the mouth 131 and stop parts 130. The loop 128 is somewhat elongated and is wider than usual in such clasps. It extends outwardly of the boundary of the cup 102 for a purpose now to appear. The sides of the loop 128 are apertured in line with a longitudinal geometrical projection of the cup and a heavy wire annular split ring 132 has its extremities set through these openings and bent toward the center of the ring sufficiently to prevent withdrawal. The ring may be rotated in the openings in the loop from a position lying inwardly over the fuze as in Fig. 15 to extend outwardly from the loop as a pull ring to withdraw the pin. The ring is of such diameter that it may lie concentrically around the outer part of the fuze as in Fig. 15 in its inner position. The width of the spring stock for the pin being as stated, when the pin is thrust inward around the sleeve 125, its arms rest with their longitudinal edges at one side of the pin lying against the flat outer face of the block 105 while the opposite longitudinal edges of the pin are close against the under side of the flat medial part of the spring 120, close to the base of the collar 124.

It is an important advantage of this mine that, provided the well 22 is formed with a close approximation of a standard depth, the boss 40 correctly shaped, and the seat 51 and boss 52 in proper relation, the operative relations of the fuze and presser are determined by the spring stack, so that so far as correct firing function of the mine is concerned, exactitude is not required in the proportions, shapes and forms of the parts of the mine.

It will be appreciated that the clearance between the plug 73 (in armed position) and plunger 78 represents the deflection in the curve of Figures 11 and 16 to the extent of the space initially provided over the plunger. This movement may be as much as 0.25 inch before deformation of the sleeve 125 begins as indicated in Fig. 16, or may be less, so that the peak 125 in Fig. 16 would be in advance of the coordinate representing 0.25 deflection.

Also, if the sleeve 125 is omitted, the clearance between the plunger 78 and plug 73 may be reduced so that detonation will occur in less than 0.25 inch deflection.

It is preferred however that a substantial deflection be allowed without engagement of the plunger 78, while still retaining an ample margin of further deflection possible after movement of the plunger to detonating position. A full quarter inch deflection before beginning of resistance by the sleeve 125 is particularly advantageous in obtaining the maximum benefit of the dash pot function and also in air loading. To prevent the spring 120 from rotating around the plunger, the top face of the block 105 is provided with diametrically opposite ribs 135 at the extreme edge of the block and the spring 120 is formed at its extremities with longitudinal slots 136 fitted slidably over the ribs, and of such length as to not interfere with the flattening of the spring before the plunger crushes the ampoule when the mine is operated in armed condition.

Two lugs 137 higher than the ribs 135 are formed on top of the block 105 at its perimeter on a diametrical line at right angles to the line on which the ribs are located and the inturned ends of the ring 130 will engage on each side of one of these lugs when the pin is inserted to safety position as shown in Fig. 15, and the ring swung inward and down against the top of the fuze.

The springs 36 and column or sleeve 125 may be used with or without limitation of venting of air from between the presser and the plate 20 as a dash pot. In the instant construction shown, the pressure curve due to compression of the air at a balanced state in chambers 85 and 87 would approximate a straight line and the load deflection resultant of the operation of the presser would be represented by a curve much as indicated by dotted line in Fig. 16. With venting to the atmosphere instead of to the confining chamber 87, the curve shown in solid line in Fig. 16 would represent approximately the function of the springs 36 and sleeve 125.

It may be seen from Fig. 11 that the apex of the mean of the maximum and minimum pressure curves indicates a ratio of load to deflexion of approximately 6 pounds to each one hundredth of an inch of deflection) taking the abscissa 25 as the apex of the curve), or, $L=6D$ where D is the deflexion measured in hundredths of an inch and the product is stated in pounds. The ratio is greater from zero of the graph to the knee of the mean curve in zone 39.

It will also be noted that beyond this function of the spring the construction shown permits a further deflection beyond the maximum load sustaining point or apex of the curve of approximately fifteen hundredths of an inch to the "solid" position of the spring stack. Thus, this further deflection after maximum load is limited to a movement which is three fifths of the total deflection of the spring at maximum load (represented by the mean of the extremes 88 and 89 of Fig. 11).

This represents a safe extreme deflection generally from which a spring having the qualities and the load deflection ratio above stated may recover when relieved of load, without permanent deformation or material impairment of its function.

It is also apparent that this movement beyond the apex of the mean curve approximates 3/5 of the deflexion to the apex of the curve where the maximum load capacity is manifest, and it may be stated that the final deflection $d$ beyond the apex of the curve approximates $$d = \frac{3D}{5}$$

It should be understood that in the use of the Belleville springs in this invention, there is no intent or purpose to derive a component of driving force for the firing pin or plunger 78 from the action of the springs themselves after passing the geometrically apparent dead center position when the springs are planiform, nor from action by passing the actual dead center position at a further deformation when, by the reaction of the material from compression and tension stresses of a columnar nature the spring would tend to assume a reversed form. On the contrary, it is desired that the spring shall always be able to recover its initial form by reaction due to its inherent elasticity. The limit of deflection is therefore so located that the reaction from bending stresses overbalances any opposing reaction from columnar stresses. This stopped position must therefore be close to the referred to geometrical dead center or planiform position of the springs.

The position or form of the spring under load from which it is unable to recover its original form by reaction due to its inherent elasticity may be termed the limit of elastic recovery (distinct from the limit of elasticity).

The foregoing is intended to disclose in full detail a comstruction of mine embodying the invention upon which this application is predicated, this construction having been heretofore produced and used in quantity in the national defense, but it will be understood, nevertheless that this is largely exemplary and that modifications of the structure, arrangement and proportions of the parts, substitution of materials and equivalents, mechanical or otherwise, may be made without departing from the spirit of the invention hereinafter claimed.

I claim:

1. A mine and pressure device comprising a base, a presser thereover vertically movable to and from a full stroke position, a pile of Belleville spring rings set in the chamber in supporting relation to the presser, a flexible seal web joined to the base and to the presser constructed to retain air under pressures of loads on said presser, and defining a dashpot chamber between the base and presser, and a detonator having an operating plunger in the path of, engaged by, and movable in the same direction as, the presser, said plunger having a firing position short of the full stroke position of the presser.

2. The structure of claim 1 in which the full stroke movement of the presser is greater than the operating movement of the plunger with the presser by a fraction of said operating movement, and said springs having characteristics represented by a load-deflection curve having an apex of load at a deflection less than the corresponding deflection movement of the presser from unloaded position to said firing position.

3. A mine comprising a base having a circularly recessed top plate provided with an axial detonator well, said recess having a cylindrical bounding wall having a plurality of nodules thereon, a circular vertically reciprocable presser arranged concentrically within the recess, supporting spring means between the presser and plate, an annular web seal adjacent the wall of the recess having a lip adjacent the base of the wall and a lip alined with the peripheral edge portion of the presser, said presser including an annular clamping means engaged with the second named lip portion of the seal, and a retainer ring having a wall adapted to fit within the wall of the recess and having a lower clamping edge to engage the first named lip and being circumferentially grooved to receive said nodules therein when in clamping engagement with the seal lip, said presser constructed and adapted to engage and operate a detonator set in said well, and restricted means to vent air, from between said plate and presser.

4. The structure of claim 3 in which said presser includes a lateral base flange movable in the recess, said retainer ring having an upper inwardly projected flange to engage over said base flange at unloaded position of the presser.

5. The structure of claim 3 in which said presser comprises an upper load receiving plate having a depending wall and an inner depending circular plug-receiving part, and a bottom plate joined to said inner depending part with its peripheral portion underlying said depending wall, said upper lip of the seal web being laid over said underlying part, said depending wall and bottom plate in clamping engagement with the interposed web part.

6. The structure of claim 3 in which said nodules are arranged at a uniform height, said retainer having a single horizontal groove to receive the nodules against the upper side of the groove when the retainer is in compressing relation to the lower lip of said seal, whereby the retainer may be pressed into said recess to move the groove into said alinement with the nodules, said retainer having an external maximum radius greater than the radius of the apices of the nodules from the center of the recess.

7. In a mine of the character described, a mine body, a firing device thereon having a plunger, a collapsible chamber formed on the body above the plunger including a vertically movable load-receiving, spring-supported presser arranged to engage the plunger operatively, said chamber having limited vents opening therefrom, said presser being a chambered body, and said vents being apertured in the lower wall of the presser, communicating with the interior of the latter and with said collapsible chamber.

8. In a mine of the character described, a mine body, a firing device thereon having a plunger, a collapsible chamber formed on the body above the plunger including a vertically movable load-receiving, spring-supported presser arranged to engage the plunger operatively, said chamber having limited vents opening therefrom, said body being an oblate one formed with a recess over a major part of its area of the upper side, said presser being of a contour and size corresponding to that of said recess for translative vertical movement in the recess, a central operating load spring confined between the body and presser, an air seal between the sides of the recess and presser, comprising an annular flexible wall element joined to the base and to the presser constructed to permit free vertical movement of the presser, so that the presser and the body and seal constitute said chamber.

PAUL L. CHRISTENSEN.

REFERENCES CITED

The following references are of record in the file of this patent:

UNITED STATES PATENTS

| Number | Name | Date |
|---|---|---|
| 527,222 | Smith | Oct. 9, 1894 |
| 1,682,560 | Gruber | Aug. 28, 1928 |
| 1,826,597 | Brecht | Oct. 6, 1931 |
| 2,162,719 | Hay | June 20, 1939 |
| 2,336,701 | Rasmussen | Dec. 14, 1943 |
| 2,358,403 | Gore et al. | Sept. 19, 1944 |
| 2,375,522 | Campbell | May 8, 1945 |
| 2,376,332 | Adelman | May 22, 1945 |
| 2,398,718 | Rasmussen | Apr. 16, 1946 |

FOREIGN PATENTS

| Number | Country | Date |
|---|---|---|
| 326,236 | Germany | Sept. 25, 1920 |
| 750,351 | France | May 22, 1933 |